(12) United States Patent
Li

(10) Patent No.: US 11,314,308 B2
(45) Date of Patent: Apr. 26, 2022

(54) CONTROL METHOD FOR MOBILE TERMINAL AND CONTROLLED DEVICE, APPARATUS AND SYSTEM

(71) Applicants: Zhejiang Geely Holding Group Co., LTD., Hangzhou (CN); Zhejiang Geely Automobile Research Institute Co., LTD., Taizhou (CN)

(72) Inventor: Shufu Li, Hangzhou (CN)

(73) Assignees: ZHEJIANG GEELY HOLDING GROUP CO., LTD., Hangzhou (CN); ZHEJIANG GEELY AUTOMOBILE RESEARCH INSTITUTE CO., LTD., Taizhou (CN)

( * ) Notice: Subject to any disclaimer, the term of this patent is extended or adjusted under 35 U.S.C. 154(b) by 138 days.

(21) Appl. No.: 16/484,820

(22) PCT Filed: Feb. 8, 2018

(86) PCT No.: PCT/CN2018/075704
§ 371 (c)(1),
(2) Date: Aug. 8, 2019

(87) PCT Pub. No.: WO2018/145641
PCT Pub. Date: Aug. 16, 2018

(65) Prior Publication Data
US 2019/0361512 A1 Nov. 28, 2019

(30) Foreign Application Priority Data
Feb. 8, 2017 (CN) .......................... 201710069799.3

(51) Int. Cl.
*G06F 1/3209* (2019.01)
*G06F 1/16* (2006.01)
(Continued)

(52) U.S. Cl.
CPC .......... *G06F 1/3209* (2013.01); *G06F 1/1698* (2013.01); *G06F 1/3231* (2013.01); *G05B 15/02* (2013.01); *G05B 2219/2642* (2013.01)

(58) Field of Classification Search
CPC ............ G05B 15/02; G05B 2219/2642; G05B 19/4183; G06F 1/1698; G06F 1/3209;
(Continued)

(56) References Cited

U.S. PATENT DOCUMENTS 8,544,761 B2 * 10/2013 Deivasigamani ... F24D 17/0026
236/20 R
2007/0173266 A1 * 7/2007 Barnes, Jr. ........... G06Q 20/322
455/456.1
(Continued)

FOREIGN PATENT DOCUMENTS

CN 1937551 A 3/2007
CN 202216359 U 5/2012
(Continued)

*Primary Examiner* — Chun Cao
(74) *Attorney, Agent, or Firm* — Cheng-Ju Chiang

(57) ABSTRACT

A control method includes: detecting a distance between a mobile terminal and a controlled device; controlling the controlled device to make the controlled device in power-on status automatically when the distance between the mobile terminal and the controlled device is within a preset distance; establishing a connection between the mobile terminal and the controlled device, so that a user sends a control instruction to the controlled device through the mobile terminal, to make the controlled device execute a corresponding operation. According to the control method, the control apparatus and the control system of the present disclosure, the controlled device may be controlled automatically to be in power-on status when the distance between the mobile terminal and the controlled device is within the preset distance, so that a user may send a control
(Continued)

instruction to the controlled device. Thusly, the control efficiency is improved, and the user experience is good.

11 Claims, 2 Drawing Sheets

(51) Int. Cl.
*G06F 1/3231* (2019.01)
*G05B 15/02* (2006.01)

(58) Field of Classification Search
CPC .... G06F 1/3215; G06F 1/3218; G06F 1/3231; G06F 3/011; H04N 21/42204; H04N 21/43615; H04M 1/72415; H04M 1/72533; Y02D 10/00; Y02P 90/02
USPC .......................................................... 713/300
See application file for complete search history.

(56) References Cited

U.S. PATENT DOCUMENTS

| | | | |
|---|---|---|---|
| 2007/0259690 A1* | 11/2007 | Julian | H04L 67/24 455/557 |
| 2008/0278583 A1* | 11/2008 | Evenson, II | H04N 21/42204 348/164 |
| 2011/0055606 A1 | 3/2011 | Wu et al. | |
| 2011/0080529 A1* | 4/2011 | Wong | H04N 21/42204 348/734 |
| 2011/0178969 A1* | 7/2011 | Falchuk | G06N 5/04 706/45 |
| 2013/0234840 A1* | 9/2013 | Trundle | G05B 15/02 340/12.53 |
| 2013/0331087 A1* | 12/2013 | Shoemaker | H04W 4/021 455/420 |
| 2015/0090865 A1 | 4/2015 | Calatayud et al. | |
| 2015/0349972 A1* | 12/2015 | Deivasigamani | H04L 12/2816 700/275 |
| 2016/0191836 A1* | 6/2016 | Weng | H04N 21/42204 348/734 |

FOREIGN PATENT DOCUMENTS

| | | | | |
|---|---|---|---|---|
| CN | 102985302 A | | 3/2013 | |
| CN | 104019522 A | | 9/2014 | |
| CN | 105841291 A | * | 8/2016 | ............. F24F 11/00 |
| CN | 105841291 A | | 8/2016 | |
| CN | 205427468 U | | 8/2016 | |
| CN | 106842968 A | | 6/2017 | |
| JP | 2002-264635 A | | 9/2002 | |
| JP | 2006-147183 A | | 6/2006 | |
| JP | 2008-225823 A | | 9/2008 | |
| JP | 2009-533990 A | | 9/2009 | |
| JP | 2012-60285 A | | 3/2012 | |

* cited by examiner

CONTROL METHOD FOR MOBILE TERMINAL AND CONTROLLED DEVICE, APPARATUS AND SYSTEM

CROSS REFERENCE TO RELATED APPLICATION

The present application is based on and claims priority of Chinese patent application No. 201710069799.3, filed on Feb. 8, 2017. The entire disclosure of the above-identified application is hereby incorporated by reference herein and made a part of this specification.

FIELD OF THE INVENTION

The present disclosure relates to the field of communications technologies, and more particularly to a control method, a control apparatus and a control system.

BACKGROUND OF THE INVENTION

The current smart home devices (such as audio and video devices, lighting systems, curtain devices, air conditioning devices, security systems, digital cinema systems, network appliances and meter reading systems) are often connected with each other by means of Internet of things technology, and a smart home control apparatus controls various smart home devices, including provides a plurality of functions and measures such as home appliance control, lighting control, curtain control, telephone remote control, indoor and outdoor remote control, burglar alarm, environmental monitoring, HVAC control, infrared relay and programmable timing control. The certain area may be such as home area, office area, etc.

Compared with a common home device, a smart home device is provided not only with traditional residential functions, but also with network communications function, information appliances function, device automation function, and provides efficient, comfortable, safe, convenient, environment friendly living environment by combining system, structure, service, management as a whole, to offer omni-directional information interactions. Through the smart home control apparatus, the various smart home devices may be controlled with convenient operation, in order to assist families keeping information communication with outside, optimize people's lifestyles, help people arrange their schedule effectively and enhance the safety of the home life.

However, the intelligent level of the current smart home devices can not fully satisfy the requirements of the users, especially for those who are not familiar with the operations of computer systems. Since the entire Internet of things system requires a large number of settings and a large number of operations shall also be done with mobile terminals, the control efficiency is low, and the user experience is poor.

SUMMARY OF THE INVENTION

Therefore, the present disclosure provides a control method, which may control a controlled device in power-on status automatically, to make the user experience good.

The present disclosure provides a control method, including: detecting the distance between a mobile terminal and a controlled device; controlling the controlled device automatically to make the controlled device in power-on status when the mobile terminal satisfies a preset condition, wherein the preset condition includes that the distance between the mobile terminal and the controlled device is within a preset distance; establishing a connection between the mobile terminal and the controlled device, so that a user sends a control instruction to the controlled device through the mobile terminal, to make the controlled device execute a corresponding operation.

The present disclosure also provides a control apparatus, including: a detecting module, a control module and a communication module. The detecting module is configured to detect a distance between a mobile terminal and a controlled device. A control module is configured to control the controlled device automatically to make the controlled device in power-on status when the mobile terminal satisfies a preset condition, wherein the preset condition includes that the distance between the mobile terminal and the controlled device is within a preset distance. A communication module is configured to establish a connection between the mobile terminal and the controlled device, so that a user sends a control instruction to the controlled device through the mobile terminal.

The present disclosure also provides a control system, including said control apparatus and said mobile terminal.

According to the control method, the control apparatus and the control system of the present disclosure, the controlled device may be controlled automatically to be in power-on status at least when the distance between the mobile terminal and the controlled device is within the preset distance, so that a user may send a control instruction to the controlled device through the mobile terminal. Thusly, the control efficiency is improved, and the user experience is good.

In order to further elucidate the technical means and efficacy of the present disclosure for achieving the intended purpose of the disclosure, the present disclosure will be described in more detail with reference to the accompanying drawings and preferred embodiments as follow.

DETAILED DESCRIPTION OF PREFERRED EMBODIMENTS

In order to further elucidate the technical means and efficacy of the present disclosure for achieving the intended purpose of the disclosure, the present disclosure will be described in more detail with reference to the accompanying drawings and preferred embodiments as follow.

Figure 1:
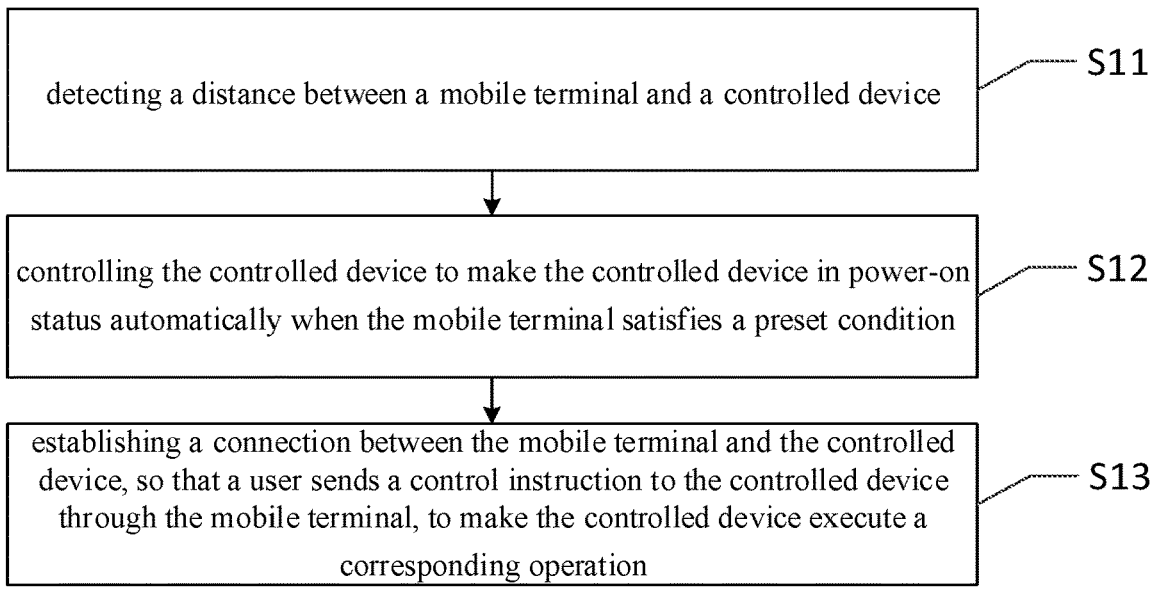
FIG. 1 is a schematic process view of a first embodiment of a control method of the present disclosure.

FIG. 1 is a schematic process view of a first embodiment of a control method of the present disclosure. The control method as shown in FIG. 1 may be applied in smart home equipment. As shown in FIG. 1, a control method includes following steps:

Step S11: detecting a distance between a mobile terminal and a controlled device.

Specifically, a location information may, but not limited to, be obtained on the basis of the local settings of GPS technology, to obtain the distance between the mobile terminal and the controlled device.

Step S12: controlling the controlled device automatically to make the controlled device in power-on status when the mobile terminal satisfies a preset condition;

wherein the preset condition includes that the distance between the mobile terminal and the controlled device is within a preset distance.

Specifically, the preset distance may have identical or different value when the relative orientation between the mobile terminal and the controlled device varies, e.g. when the mobile terminal is in the due east direction of the controlled device, the preset distance is 5 meters, when the mobile terminal is in the due west direction of the controlled device, the preset distance is 4 meters, etc. Wherein, the preset distance may have a fixed preset value, or have a dynamic value preset according to the environment of the controlled device, e.g. may but not limited to be the distance between the controlled device and the wall of the room.

Specifically, the preset condition may but not limited to further comprise include that the duration time that the user carrying with the mobile terminal faces towards the controlled device and/or the user stays on a sofa exceeds a first preset time, also may but not limited to further include that the duration time that the distance between the mobile terminal and the controlled device within the preset distance exceeds a second preset time, and/or that the time point the distance between the mobile terminal and the controlled device being within the preset distance falls within a third preset time period.

Wherein, a camera may but not limited to be utilized to monitor whether the user carrying with the mobile terminal faces towards the controlled device, as well as whether the user stays on a sofa.

In one embodiment, the step S12: controlling the controlled device automatically to make the controlled device in power-on status when the mobile terminal satisfies a preset condition, further includes:

adjusting a working parameter of the controlled device according to historical behavior data of the user corresponding to the mobile terminal, or the distance between the mobile terminal and the controlled device, or the environment index of the controlled device.

Specifically, the environment index may but not limited to include at least one of temperature, humidity and brightness.

Specifically, the working parameter of the controlled device means the running parameter when the controlled device is in working status, namely in enabling status. For example, when the controlled device is a television, the working parameter may include at least one of channel, brightness and volume of the television; when the controlled device is a lamp, the working parameter may but not limited to include brightness; when the controlled device is a music player, the working parameter may but not limited to include at least one of volume, playing content and sound frequency; when the controlled device is an air conditioner, the working parameter may but not limited to include at least one of heating or cooling gear, dehumidifying or humidifying gear. Obviously, the controlled device may also be other devices such as a curtain or a water heater.

Step S13: establishing a connection between the mobile terminal and the controlled device, so that a user sends a control instruction to the controlled device through the mobile terminal, to make the controlled device execute a corresponding operation.

Specifically, the mobile terminal and the controlled device may communicate with each other via wireless signal such as LAN, Bluetooth, etc.

Figure 2:
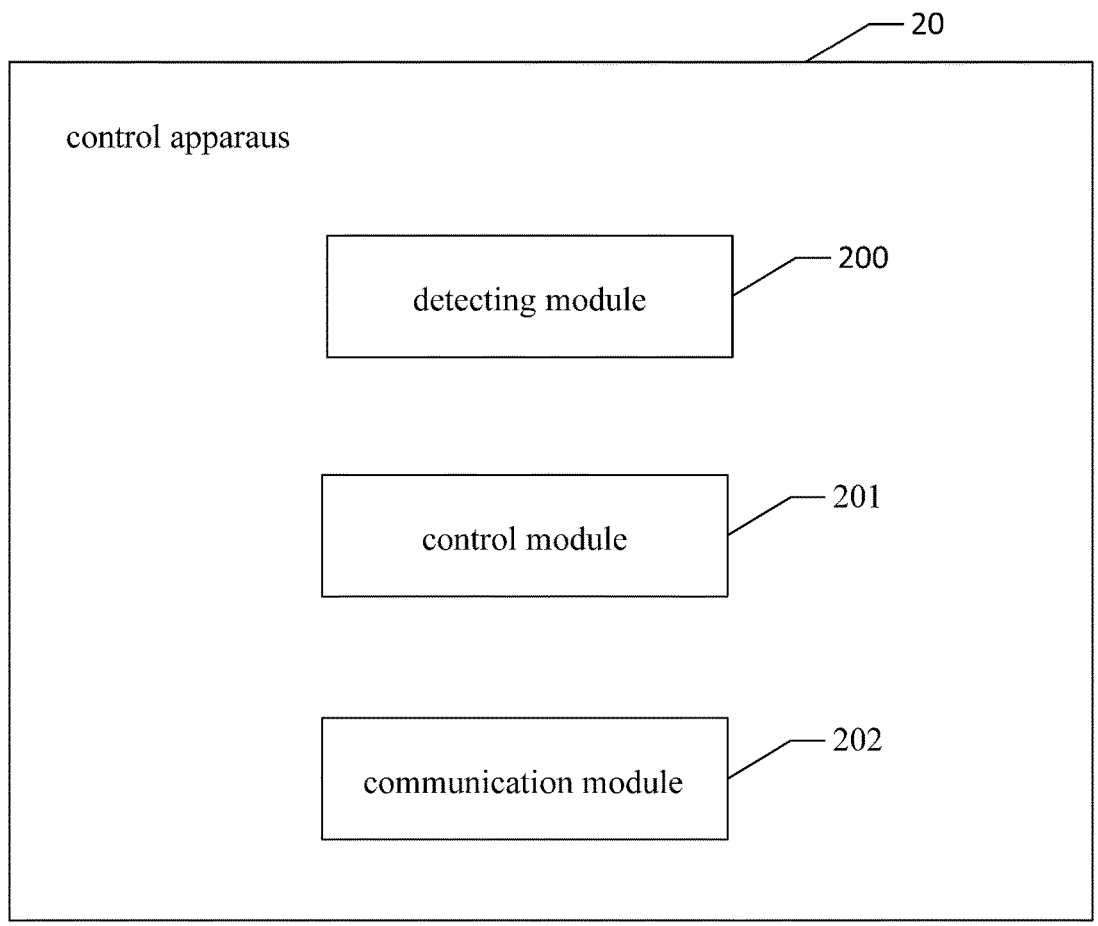
FIG. 2 is a schematic structural view of a second embodiment of a control apparatus of the present disclosure.

FIG. 2 is a schematic structural view of a second embodiment of a control apparatus of the present disclosure. As shown in FIG. 2, the control apparatus 20 includes a detecting module 200, a control module 201, and a communication module 202.

Wherein the detecting module 200 is configured to detect the distance between the mobile terminal and the controlled device. The control module 201 is configured to control the controlled device automatically to make the controlled device in power-on status when the mobile terminal satisfies the preset condition, wherein the preset condition includes that the distance between the mobile terminal and the controlled device is within the preset distance. The communication module 202 is configured to establish a connection between the mobile terminal and the controlled device, so that a user sends a control instruction to the controlled device through the mobile terminal, to make the controlled device execute the corresponding operation.

Specifically, at least one of the detecting module 200, the control module 201 and the communication module 202 may but not limited to be arranged within the controlled device.

In one embodiment, the controlled device is a television, the control module 201 controls the television to be in power-on status, when the distance between the mobile terminal and the television is within a preset distance, e.g. 5 meters, and the duration time that the user carrying with the mobile terminal faces towards the television exceeds a first preset time, e.g. 5 seconds.

Specifically, the control module 201 may but not limited to further be configured to adjust the channel of the television to a user-concerned channel according to historical behavior data of the user corresponding to the mobile terminal automatically.

Specifically, the concerned channel may but not limited to be the channel which is most viewed or longest viewed, may also be a highest scored channel after the weight value distribution of the viewing frequency and the viewing time and scoring. Obviously, the concerned channel may also be a channel set by user.

In one embodiment, the controlled device is a lamp, and the control module 201 is also configured to adjust the brightness of the lamp according to a distance of the mobile terminal and the lamp. The control module 201 may but not limited to further be configured to adjust brightness of the lamp according to an environment of the lamp, wherein the brighter the environment of the lamp is, the darker the lamp will be adjusted; the darker the environment of the lamp is, the brighter the lamp will be adjusted.

In one embodiment, the controlled device is an air conditioner, and the control module is configured to control the air conditioner to be in power-on status when a duration time that the distance between the mobile terminal and the air conditioner is within the preset distance exceeds a second preset time, e.g. 4 seconds, and to adjust the working parameter of the air conditioner according to the temperature and the humidity of the environment of the air conditioner.

In one embodiment, the controlled device is a music player, and the control module 201 is configured to control the music player to be in power-on status when the distance of the mobile terminal and the controlled device is within the preset distance, and the time point the distance between the mobile terminal and the controlled device being within the preset distance falls within a third preset time period, e.g.

8:00 to 18:00, and to adjust the content played by the music player to a user-concerned content according to the historical behavior data of the user corresponding to the mobile terminal automatically.

Specifically, the third preset time period may but not limited to be a time period set by user, and also may but not limited to be a time period that the user switching the music player on over the preset times.

Specifically, the user-concerned content may but not limited to be the content most frequently played by user, or the content longest played by user, or may but not limited to be a sound frequency set by user.

Figure 3:
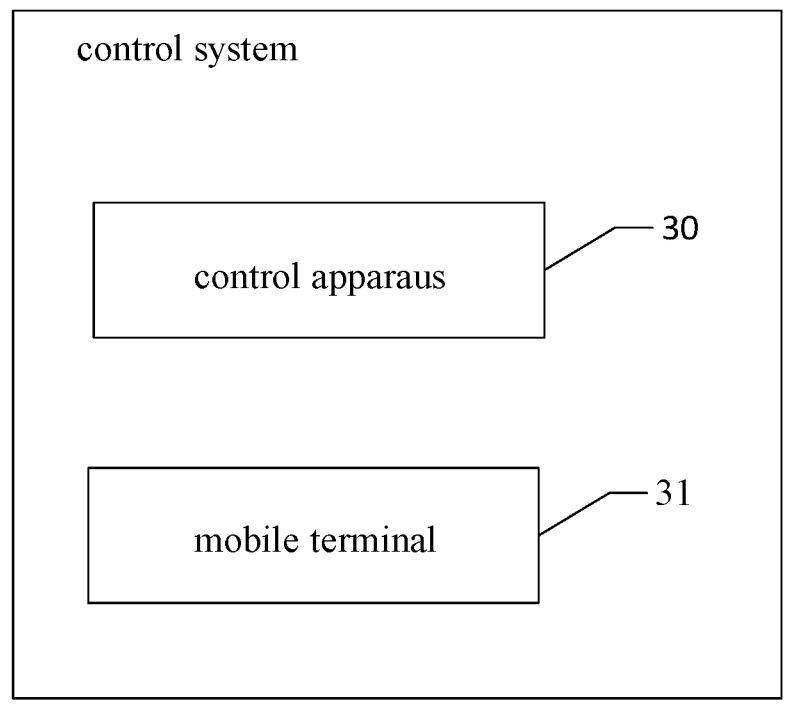
FIG. 3 is a schematic structural view of a third embodiment of a control system of the present disclosure.

FIG. 3 is a schematic structural view of a third embodiment of a control system of the present disclosure. As shown in FIG. 3, the control system of the present disclosure includes the control apparatus 30 and the mobile terminal 31.

The control apparatus 30 is configured to detect the distance between the mobile terminal 31 and the controlled device, to control the controlled device to make the controlled device in power-on status automatically when the mobile terminal satisfies the preset condition, and to establish the connection between the mobile terminal 31 and the controlled device, so that a user sends the control instruction to the controlled device through the mobile terminal 31, to make the controlled device execute the corresponding operation, wherein the preset condition includes that the distance between the mobile terminal 31 and the controlled device is within the preset distance.

Figure 4:
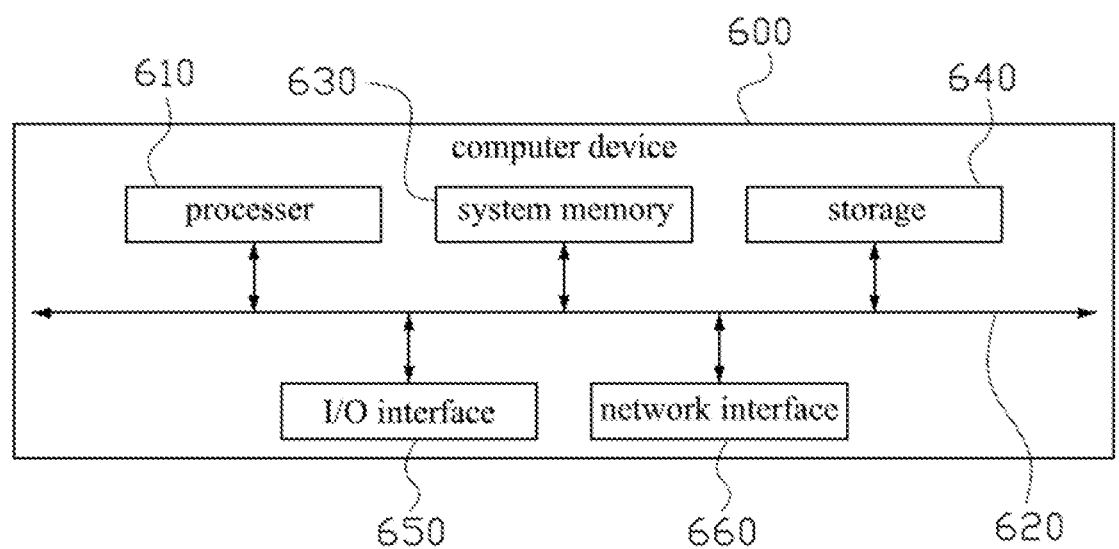
FIG. 4 is a diagram illustrating an example computing system that may be used in one embodiment of the present disclosure.

FIG. 4 is a diagram illustrating an example computing system that may be used in one embodiment of the present disclosure. Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, include one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages—such as Ruby, Perl, Python, C, C++, and the like—or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

In at least some embodiments, a server or computing device that implements a portion or all of one or more of the technologies described herein, including the techniques to implement the functionality of control method, may include a general-purpose computer system that includes or is configured to access one or more computer-accessible media. FIG. 4 illustrates such a general-purpose computing device 600. In the illustrated embodiment, computing device 600 includes one or more processors 610 (which may be referred herein singularly as "a processor 610" or in the plural as "the processors 610") are coupled through a bus 620 to a system memory 630. Computing device 600 further includes a permanent storage 640, an input/output (I/O) interface 650, and a network interface 660.

In various embodiments, the computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 630 may be configured to store instructions and data accessible by processor(s) 610. In various embodiments, system memory 630 may be implemented using any suitable memory technology, such as static random access memory (SRAM), synchronous dynamic RAM (SDRAM), nonvolatile/Flash-type memory, or any other type of memory.

In one embodiment, I/O interface 650 may be configured to coordinate I/O traffic between processor 610, system memory 630, and any peripheral devices in the device, including network interface 660 or other peripheral interfaces. In some embodiments, I/O interface 650 may perform any necessary protocol, timing, or other data transformations to convert data signals from one component (e.g., system memory 630) into a format suitable for use by another component (e.g., processor 610). In some embodiments, I/O interface 650 may include support for devices attached through various types of peripheral buses, such as a variant of the Peripheral Component Interconnect (PCI) bus standard or the Universal Serial Bus (USB) standard, for example. In some embodiments, the function of I/O interface 650 may be split into two or more separate components, such as a north bridge and a south bridge, for example. Also, in some embodiments some or all of the functionality of I/O interface 650, such as an interface to system memory 630, may be incorporated directly into processor 610.

Network interface 660 may be configured to allow data to be exchanged between computing device 600 and other device or devices attached to a network or network(s). In various embodiments, network interface 660 may support communication via any suitable wired or wireless general data networks, such as types of Ethernet networks, for example. Additionally, network interface 660 may support communication via telecommunications/telephony networks such as analog voice networks or digital fiber communications networks, via storage area networks such as Fibre Channel SANs or via any other suitable type of network and/or protocol.

In some embodiments, system memory 630 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 600 via I/O interface 650. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 600 as system memory 630 or another type of memory.

Further, a computer-accessible medium may include transmission media or signals such as electrical, electromagnetic or digital signals, conveyed via a communication medium such as a network and/or a wireless link, such as may be implemented via network interface 660. Portions or all of multiple computing devices may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices. Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

According to the control method, the control apparatus and the control system of the present disclosure, the controlled device may be controlled automatically to be in power-on status at least when the distance between the mobile terminal and the controlled device is within the preset distance, so that a user may send a control instruction to the controlled device through the mobile terminal. Thusly, the control efficiency is improved, and the user experience is good.

It should be noted that the embodiments in the specification are described in a progressive manner. The description of any embodiment focuses on the difference compared with other embodiments. The same or similar elements of the respective embodiments may refer to each other. The embodiments of the devices and the embodiments of the corresponding method may refer to each other, so as to omit the duplicated description.

It should be noted that the relational terms herein such as first and second are used only to differentiate one entity or operation from another entity or operation, and do not require or imply any actual relationship or sequence between these entities or operations. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The ordinary person skilled in the art can understand that all or part of the steps in the above method can be completed by a hardware or be completed by a program instructing related hardware, and the program can be stored in a computer readable memory medium, such as a read-only memory, disk or optical disk and so on.

The above are merely the preferred embodiments of the present invention and are not intended to limit the present invention in any form. Although the present invention has been disclosed by the preferred embodiments as mentioned above, the preferred embodiments are not used for limiting the present invention. Many possible variations and modifications may be made to the technical solutions of the present invention, or the technical solutions of the present invention may be modified into equivalent embodiments changed equivalently, without departing from the scope of the technical solutions of the present invention by any person skilled in the art by using the methods and technical contents as disclosed above. Therefore, any simple modifications, equivalent changes and modifications made to the embodiments above according to the technical essence of the present invention without departing from the contents of the technical solutions of the present invention shall belong to the scope of protection of the technical solutions of the present invention.

What is claimed is:

1. A control method, wherein the control method comprises:
    detecting a distance between a mobile terminal and a controlled device;
    controlling the controlled device to make the controlled device in power-on status automatically when the mobile terminal satisfies a preset condition, wherein the preset condition comprises that the distance between the mobile terminal and the controlled device is within a preset distance;
    establishing a connection between the mobile terminal and the controlled device, so that a user sends a control instruction to the controlled device through the mobile terminal, to make the controlled device execute a corresponding operation;
    wherein the preset condition further comprises that a duration time that the user carrying with the mobile terminal faces towards the controlled device exceeds a first preset time, and the preset condition further comprises that a time point the distance between the mobile terminal and the controlled device being within the preset distance falls within a third preset time period;
    wherein the step controlling the controlled device to make the controlled device in power-on state automatically when the mobile terminal satisfies a preset condition further comprises:
        adjusting a working parameter of the controlled device according to the distance between the mobile terminal and the controlled device.

2. The control method according to claim 1, wherein the preset condition further comprises that a duration time that the distance between the mobile terminal and the controlled device is within the preset distance exceeds a second preset time.

3. The control method according to claim 1, wherein the step controlling the controlled device to make the controlled device in power-on state automatically when the mobile terminal satisfies a preset condition further comprises:
    adjusting a working parameter of the controlled device according to the historical behavior data of the user corresponding to the mobile terminal, or according to an environment index of the controlled device.

4. A control apparatus, wherein the control apparatus comprises:
    a detecting module, being configured to detect a distance between a mobile terminal and a controlled device;
    a control module, being configured to control the controlled device to be in power-on status automatically when the mobile terminal satisfies a preset condition, wherein the preset condition comprises that the distance between the mobile terminal and the controlled device is within a preset distance;
    a communication module, being configured to establish a connection between the mobile terminal and the controlled device, so that a user sends a control instruction to the controlled device through the mobile terminal, to make the controlled device execute a corresponding operation;
    wherein the preset condition further comprises that a duration time that the user carrying with the mobile terminal faces towards the controlled device exceeds a first preset time, and the preset condition further comprises that a time point the distance between the mobile terminal and the controlled device being within the preset distance falls within a third preset time period;
    wherein the control module further is configured to adjusting a working parameter of the controlled device according to the distance between the mobile terminal and the controlled device.

5. The control apparatus according to claim 4, wherein the detecting module, the control module and the communication module are arranged within the controlled device.

6. The control apparatus according to claim 4, wherein the controlled device is a television, wherein the control module controls the television to be in power-on status, when a distance between the mobile terminal and the television is within the preset distance, and a duration time that the user carrying with the mobile terminal faces towards the television exceeds a first preset time.

7. The control apparatus according to claim 6, wherein the control module is further configured to adjust a channel of the television to a user-concerned channel according to the historical behavior data of the user corresponding to the mobile terminal automatically.

8. The control apparatus according to claim 4, wherein the controlled device is a lamp, wherein the control module is further configured to adjust a brightness of the lamp according to a distance between the mobile terminal and the lamp.

9. The control apparatus according to claim 4, wherein the controlled device is an air conditioner, wherein the control module is configured to control the air conditioner to be in power-on status when a duration time that a distance between the mobile terminal and the air conditioner is within the preset distance exceeds a second preset time, and to adjust a working parameter of the air conditioner according to the temperature and the humidity of environment of the air conditioner.

10. The control apparatus according to claim 2, wherein the controlled device is a music player, wherein the control module is configured to control the music player to be in power-on status when a time point the distance between the mobile terminal and the music player being within the preset distance falls within a third preset time period, and to adjust a content played by the music player to a user-concerned content according to the historical behavior data of the user corresponding to the mobile terminal automatically.

11. A control system, wherein the control system comprises the control apparatus according to claim 4 and a mobile terminal.

* * * * *